J. STEPHEN.
Thill-Coupling.
No. 65,293.
Patented May 28, 1867.
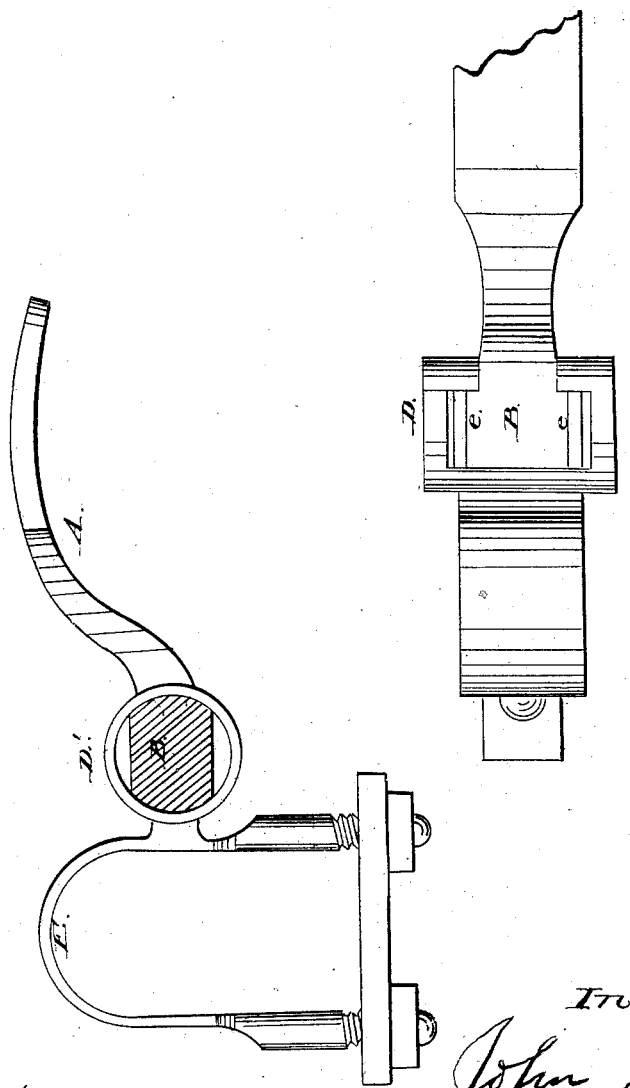
Witnesses.
Inventor,
John Stephen
her
Alexander J Mason
Atty

United States Patent Office.

JOHN STEPHEN, OF WOMELSDORF, PENNSYLVANIA.

Letters Patent No. 65,293, dated May 28, 1867.

IMPROVEMENT IN SHAFT-COUPLING.

*The Schedule referred to in these Letters Patent and making part of the same.*

TO ALL WHOM IT MAY CONCERN:

Be it known that I, JOHN STEPHEN, of Womelsdorf, in the county of Berks, and in the State of Pennsylvania, have invented certain new and useful Improvements in Shaft-Coupling; and do hereby declare that the following is a full, clear, and exact description thereof, reference being had to the accompanying drawings, and to the letters of reference marked thereon.

In the annexed drawings, making part of this specification, A represents the shaft-iron, which is provided at its end, which connects to the clip, with a short cross-bar, B, which may be round or in the form represented. Near the ends of this cross-bar grooves are formed around it, into which are shrunk India-rubber bands $c\ c$, but so that they will protrude outside of said grooves. E represents the usual loop portion of a clip, with threads upon each end, over which a cross-bar passes, and nuts to confine it to the axle of the vehicle. On the front side of the loop E is formed a short barrel or cylinder, D, which is hollow, and either closed or open at both ends. This cylinder is provided with two slots, one at right angles to the other, or with a T-shaped slot, through which the end of the shaft-iron is allowed to enter the said cylinder or barrel. The slot, through which the end of the iron enters, is on the upper side of the cylinder, and the cross-slot is in the front side. In this latter slot the shaft-iron rests when the shafts are in position for drawing. In order to secure the shafts to this clip they are raised to nearly a vertical position, until the cross-bar of the iron will pass into the slot on top of the cylinder. As soon as this bar passes into the cylinder, the outer ends of the shafts are dropped, and they are confined to the vehicle. The rubber rings or bands $c\ c$ fit snugly against the inside of the cylinder D, and prevent any rattle of the parts. These devices make a simple and cheap coupling, as well as an anti-rattler.

Having thus fully described my invention, what I claim as new, and desire to secure by Letters Patent, is—

The bar B, provided with grooves and the rubber $c\ c$, when used in combination with the barrel D, when constructed in the manner substantially as and for the purpose specified.

In testimony that I claim the foregoing I have hereunto set my hand this 21st day of March, 1867.

JNO. STEPHEN.

Witnesses:
 A. N. MARR,
 J. M. MASON.